US012500535B2

United States Patent
Hu et al.

(10) Patent No.: US 12,500,535 B2
(45) Date of Patent: Dec. 16, 2025

(54) CONTROL METHOD FOR FAN, FAN, HOUSEHOLD APPLIANCE, AND COMPUTER-READABLE STORAGE MEDIUM

(71) Applicants: FOSHAN WELLING WASHER MOTOR MANUFACTURING CO., LTD., Guangdong (CN); WELLING (WUHU) MOTOR MANUFACTURING CO. LTD., Anhui (CN)

(72) Inventors: Xiaolin Hu, Guangdong (CN); Wenjing Ke, Guangdong (CN)

(73) Assignees: FOSHAN WELLING WASHER MOTOR MANUFACTURING CO., LTD., Guangdong (CN); WELLING (WUHU) MOTOR MANUFACTURING CO. LTD., Anhul (CN)

( * ) Notice: Subject to any disclaimer, the term of this patent is extended or adjusted under 35 U.S.C. 154(b) by 141 days.

(21) Appl. No.: 18/499,488

(22) Filed: Nov. 1, 2023

(65) Prior Publication Data
US 2024/0063739 A1    Feb. 22, 2024

Related U.S. Application Data

(63) Continuation of application No. PCT/CN2021/122304, filed on Sep. 30, 2021.

(30) Foreign Application Priority Data

May 8, 2021  (CN) .......................... 202110498936.1

(51) Int. Cl.
H02P 21/34    (2016.01)
H02P 21/18    (2016.01)

(52) U.S. Cl.
CPC .............. *H02P 21/34* (2016.02); *H02P 21/18* (2016.02)

(58) Field of Classification Search
CPC ...... H02P 21/34; H02P 21/18; F05D 2260/85; F05D 2270/3061; F05D 2270/335; F04D 27/001; F04D 27/004; Y02B 30/70
(Continued)

(56) References Cited

U.S. PATENT DOCUMENTS 6,014,007 A * 1/2000 Seibel .................... H02P 21/34
                                                      318/807
8,174,219 B2 * 5/2012 Oomura .................... H02P 6/20
                                                      318/400.11
(Continued)

FOREIGN PATENT DOCUMENTS

CN    101737900 A    6/2010
CN    104242765 A    12/2014
(Continued)

OTHER PUBLICATIONS

International Search Report dated Dec. 21, 2021 issued in PCT/CN2021/122304.
(Continued)

*Primary Examiner* — David Luo
(74) *Attorney, Agent, or Firm* — Scully, Scott, Murphy & Presser, P.C.

(57) ABSTRACT

A control method for a fan, a fan, a household appliance, and a computer-readable storage medium are provided. The fan includes an electric motor. The control method includes: controlling the electric motor to start to operate through a d-axis current command in response to a start command; obtaining an actual speed of the electric motor, and starting timing when the actual speed reaches a first target speed; and decreasing, when the timed duration reaches a first preset
(Continued)

duration, a d-axis current corresponding to the d-axis current command until the d-axis current is decreased to 0, and increasing a q-axis current corresponding to a q-axis current command until the q-axis current is increased to a first target current.

11 Claims, 5 Drawing Sheets

(58) Field of Classification Search
USPC .......................................... 318/807, 767, 727
See application file for complete search history.

(56) References Cited

U.S. PATENT DOCUMENTS

| | | | |
|---|---|---|---|
| 8,362,722 B2 * | 1/2013 | Onuma | ................. H02P 25/024 318/400.31 |
| 2014/0152212 A1 | 6/2014 | Zhang et al. | |

FOREIGN PATENT DOCUMENTS

| | | |
|---|---|---|
| CN | 104698893 A | 6/2015 |
| CN | 104811095 A | 7/2015 |
| CN | 104917435 A | 9/2015 |
| CN | 105322833 A | 2/2016 |
| CN | 105529979 A | 4/2016 |
| CN | 106330020 A | 1/2017 |
| CN | 106837837 A | 6/2017 |
| CN | 108540016 A | 9/2018 |
| CN | 109921697 A | 6/2019 |
| CN | 110995062 A | 4/2020 |
| CN | 113162507 A | 7/2021 |

OTHER PUBLICATIONS

Chinese First Office Action dated Apr. 20, 2022 issued in CN 202110498936.1.
Chinese Second Office Action dated Jul. 25, 2022 issued in CN 202110498936.1.
Chinese First Search Report dated Apr. 14, 2022 issued in CN 202110498936.1.
Chinese Supplementary Search Report dated Nov. 27, 2022 issued in CN 202110498936.1.

* cited by examiner

CONTROL METHOD FOR FAN, FAN, HOUSEHOLD APPLIANCE, AND COMPUTER-READABLE STORAGE MEDIUM

CROSS-REFERENCE TO RELATED APPLICATIONS

The present application is a continuation application of International Application No. PCT/CN2021/122304 filed on Sep. 30, 2021, which claims the priority to and benefits of Chinese Patent Application No. 202110498936.1, filed with the China National Intellectual Property Administration on May 8, 2021 and entitled "Control method for a fan, fan, household appliance, and readable storage medium", the entire contents of each of which are incorporated herein by reference for all purposes. No new matter has been introduced.

FIELD

The present disclosure relates to the field of fan controlling, and particularly relates to a control method for a fan, a fan, a household appliance, and a computer-readable storage medium.

BACKGROUND

In the related art, a permanent magnet synchronous motor free of a position sensor is generally applied to fans of household appliances, such as, an air conditioner, a range hood and a gas water heater. Speed and position of such a permanent magnet synchronous motor free of the position sensor are generally determined through observation of its back electromotive force.

In an existing strategy to start the permanent magnet synchronous motor free of the position sensor, the motor is driven to a speed that can be used for accurately estimating the back electromotive force through open-loop control, and is subsequently switched to closed-loop control. In order to ensure a success rate of starting the motor, a greater torque command is generally used in a low-speed stage before the closed-loop control. If an air quantity command is set to be small at the starting moment of the motor, a torque command required by switching the motor to the closed-loop control will be smaller than that before the closed-loop control, which thus results in a large actual air quantity. Therefore, during adjustment of constant air quantity controlling, obvious noise is generated by turning air quantity down, which will affect user experience.

SUMMARY

The present disclosure aims to solve at least one of the problems in the prior art or related art.

In view of that, a first aspect of the present disclosure provides a control method for a fan.

A second aspect of the present disclosure provides a fan.

A third aspect of the present disclosure provides a household appliance.

A fourth aspect of the present disclosure provides a computer-readable storage medium.

In view of that, the first aspect of the present disclosure provides a control method for a fan. The fan includes an electric motor. The control method includes: controlling the electric motor to start to operate through a d-axis current command in response to a start command; obtaining an actual speed of the electric motor, and starting timing when the actual speed reaches a first target speed; and decreasing, when the timed duration reaches a first preset duration, a d-axis current corresponding to the d-axis current command until the d-axis current is decreased to 0, and increasing a q-axis current corresponding to a q-axis current command until the q-axis current is increased to a first target current.

In the embodiment, an open-loop control stage is firstly conducted after the start command is received in a motor starting stage. In the open-loop control stage, firstly, the electric motor is controlled to start to operate through a d-axis current command, that is, by applying a current to a d-axis of the electric motor. After the electric motor starts to operate, the actual speed of the electric motor is obtained in real time. When the actual speed of the electric motor reaches the first target speed, a timer is started synchronously to start timing.

If the timed duration reaches the first preset duration, the open-loop control stage is switched to a transition stage of switching to closed-loop control. In an embodiment, the d-axis current command gradually decreases the indicated d-axis current in the transition stage, and the q-axis current command is added, and the q-axis current of the electric motor is gradually increased. The d-axis current command gradually decreases the d-axis current of the electric motor from a maximum value to 0. Synchronously, the q-axis current command gradually increases the q-axis current of the electric motor from 0 to the first target current.

In an embodiment of the present disclosure, when back electromotive force is difficult to obtain in the motor starting stage, the electric motor is firstly controlled to be started through the d-axis current command. After the starting stage, a stator current command applied by the electric motor is switched from the d-axis to a q-axis in a transition control stage of transitioning from an open-loop stage to a closed-loop stage. After adjustment of the q-axis current is completed, the electric motor may enter a closed-loop control stage according to a target air quantity setting of the fan, and smooth start and operation of the electric motor can be achieved without large-torque command control. In this way, starting the fan at a large quantity of air due to a high starting speed of the electric motor cannot be caused, smooth start and operation of the electric motor can be ensured, vibration and noise during operation of the fan can be reduced, and further air quantity noise generated when the fan is started at a small air quantity can be reduced, and comfort of users can be effectively improved.

In addition, the control method for a fan in the embodiment provided by the present disclosure may further have the following additional features.

In the embodiment, the step of controlling the electric motor to start to operate through a d-axis current command includes: determining a second target current according to the d-axis current command, and controlling the electric motor to start to operate with the second target current as the d-axis current of the electric motor.

In the embodiment, in the open-loop control stage when the electric motor starts to operate, firstly, a preset d-axis current command is obtained. The d-axis current command may be a preset value stored in a controller of the electric motor, or may be transmitted from an upper control panel when the fan is controlled to be started, which is not limited by the embodiments of the present disclosure.

The d-axis current command indicates a maximum current value of the d-axis of the electric motor, which is the second target current described above. It should be understood that the maximum current value does not exceed a rated current of the electric motor. When the electric motor is started, the d-axis current of the electric motor is gradually increased at a certain speed until the d-axis current of the electric motor reaches a second target current value. In the stage, a speed of the electric motor is gradually increased. After the speed of the electric motor reaches the first target speed, a timed duration after the speed of the electric motor reaches the first target speed is obtained. When the timed duration satisfies the first preset duration, the open-loop control stage is exited, and the transition stage of switching to the closed-loop control stage is entered. In the process, smooth start and operation of the electric motor can be achieved, and vibration and noise generated when the fan is started are reduced, and comfort of users can be effectively improved.

In an embodiment of the present disclosure, the stator current command applied by the electric motor is switched from the d-axis to the q-axis in the transition control stage. After adjustment of the q-axis current is completed, the electric motor may enter the closed-loop control stage according to the target air quantity setting of the fan, and smooth start and operation of the electric motor can be achieved. In this way, vibration and noise generated when the fan is started are reduced, and comfort of users can be effectively improved.

In any one of the embodiments, the control method for a fan further includes: adjusting the q-axis current corresponding to the q-axis current command to a third target current when the timed duration reaches a second preset duration.

In the embodiment, after the electric motor is started, the open-loop control stage is firstly entered. In the open-loop control stage, the electric motor is controlled to start to operate through the d-axis current, and timing is started after the actual speed of the electric motor is increased to the first target speed. When the timed duration reaches the first preset duration that is preset, the electric motor enters the transition stage of transitioning from the open-loop control to the closed-loop control. In the transition stage, control of the electric motor is switched from the d-axis current command to a q-axis current control command.

After the timed duration reaches the second preset duration that is preset, the electric motor completely enters the closed-loop control stage from the transition control stage. In this case, the q-axis current of the electric motor is adjusted to the third target current through the q-axis current command. In this case, the electric motor may operate stably and has a speed reaching a certain level. In this way, the back electromotive force of the electric motor may be obtained timely and accurately, and a position of a motor rotor and the actual speed of the electric motor may be obtained according to the back electromotive force, and further closed-loop control is achieved.

The embodiment of the present disclosure achieves smooth start and operation of the electric motor, may reduce vibration and noise during operation of the fan, and further may reduce noise generated due to air quantity when the fan is started at a small air quantity.

In any one of the embodiments, the rated current of the electric motor is set as the second target current; a product of the second target current and a preset coefficient is set as the first target current, where the preset coefficient ranges from 0.4 to 1.0; and a current value corresponding to the speed of the electric motor when the fan operates at a minimum air quantity is set as the third target current.

In the embodiment, the second target current is a maximum current, indicated by the d-axis current command in the motor starting stage, of the d-axis of the electric motor. The second target current is set as the rated current of the electric motor. Because the rated current of the electric motor is a fixed value, the second target current is further a fixed value when the d-axis current command is set.

The first target current is the q-axis current in the transition stage when the electric motor transitions from the open-loop control stage to the closed-loop control stage. The first target current is determined according to the second target current, that is, according to the rated current of the electric motor. In an embodiment, a ratio of the first target current to the second target current is 0.4-1.0. That is, the first target current is equal to a product of the second target current and a preset current. The preset coefficient ranges from 0.4 to 1.0. A specific value of the preset coefficient may be preset according to specific parameters of the electric motor, or dynamically adjusted according to implementation conditions of the electric motor, which is not limited by the embodiments of the present disclosure.

A control current of the speed of the electric motor corresponding to a minimum air quantity gear when the fan operates at the minimum air quantity gear is set as the third target current. In an embodiment, according to the air quantity of the fan, the air quantity of the fan may be divided into different gears. The minimum air quantity further corresponds to a lowest speed at which the electric motor may stably operate in a closed-loop manner. When the electric motor operates at the lowest speed, the q-axis current of the electric motor is the third target current described above. It may be understood that the third target current is further a preset constant current value because an air quantity gear of the fan is calibrated in advance.

In any one of the embodiments, the fan further includes a proportional integral controller. Before the adjusting the q-axis current corresponding to the q-axis current command to a third target current, the control method further includes: adjusting control torque of the proportional integral controller to control torque corresponding to the q-axis current.

In the embodiment, the fan includes the proportional integral controller, that is, the PI controller. The closed-loop control of the electric motor may be achieved by the proportional integral controller. When the electric motor is switched from the transition stage to the closed-loop control stage, before the electric motor enters the closed-loop control stage, the electric motor is adjusted from q-axis current control to torque control corresponding to the q-axis current.

The proportional integral controller is a proportional integral controller based on air quantity adjustment. The system may output control torque required for adjustment to the target air quantity and the q-axis current command corresponding to the control torque according to an air quantity command set by a user and a current air quantity, and closed-loop control of the electric motor (fan) based on air quantity adjustment is achieved.

In any one of the embodiments, the control method for a fan further includes: obtaining the current air quantity of the fan; determining target torque of the electric motor and a driving signal corresponding to the target torque by the proportional integral controller according to the target air quantity and the current air quantity; and controlling the fan to operate through the driving signal.

In the embodiment, the electric motor is to enter the closed-loop control stage after the timed duration reaches the second preset duration. In the closed-loop control stage, the fan achieves closed-loop control based on the air quantity by the proportional integral controller according to the target air quantity set by the user (or a program) and the current air quantity.

In an embodiment, a double-closed-loop vector control method of an air quantity loop and a current loop is used in closed-loop control based on a constant air quantity. Accordingly, the proportional integral controller includes an air quantity proportional integral controller and a current proportional integral controller. A control system of the fan firstly determines the target air quantity according to the air quantity command of the user, outputs control torque currently required for adjustment to the target air quantity and the corresponding current command (the q-axis current) by the air quantity proportional integral controller according to the current air quantity output from an air quantity computation device, outputs a corresponding voltage command by the current proportional integral controller, and finally outputs the corresponding driving signal through space vector pulse width modulation (SVPWM), and operation of the electric motor of the fan is controlled, and further the constant air quantity is obtained.

The second aspect of the present disclosure provides a fan. The fan includes a memory storing a program or command; and a processor configured to implement steps of the control method for a fan according to any one of the embodiments when executing the program or command, so the fan further includes all beneficial effects of the control method for a fan according to any one of the embodiments, which are not repeated herein.

In the embodiment, the fan further includes: an electric motor, where an output end of the electric motor is provided with a fan wheel or fan blade; and a proportional integral controller connected to the electric motor.

In the embodiment, the fan includes the electric motor. The electric motor is a permanent magnet synchronous motor without a position sensor, a rotor of the electric motor is connected to an output shaft, the output shaft is the output end of the electric motor, and the output end is provided with the fan wheel or fan blade. The output shaft of the electric motor drives the fan wheel or fan blade to rotate, and air is directionally stirred to form air flows, and air supply is achieved.

The fan further includes the proportional integral controller, that is, the PI controller. The closed-loop control of the electric motor may be achieved by the proportional integral controller. The proportional integral controller includes an air quantity proportional integral controller and a current proportional integral controller. A control system of the fan firstly determines the target air quantity according to the air quantity command of the user, outputs control torque currently required for adjustment to the target air quantity and the corresponding current command (the q-axis current) by the air quantity proportional integral controller according to the current air quantity output from an air quantity computation device, outputs a corresponding voltage command by the current proportional integral controller, and finally outputs the corresponding driving signal through space vector pulse width modulation (SVPWM), and operation of the electric motor of the fan is controlled, and further the constant air quantity is obtained.

The third aspect of the present disclosure provides a household appliance. The household appliance includes the fan according to any one of the embodiments, so the household appliance further includes all beneficial effects of the fan according to any one of the embodiments, which are not repeated herein.

The fourth aspect of the present disclosure provides a computer-readable storage medium storing a computer program or command. The program or command implements steps of the control method for a fan according to any one of the embodiments when being executed by a hardware processor, so the computer-readable storage medium further includes all beneficial effects of the control method for a fan according to any one of the embodiments, which are not repeated herein.

BRIEF DESCRIPTION OF THE DRAWINGS

What are described above and/or additional aspects and advantages of the present disclosure will become obvious and comprehensible from the following description of embodiments in conjunction with the accompanying drawings.

DETAILED DESCRIPTION OF THE DISCLOSURE

To make the above objectives, features and advantages of the present disclosure more obvious and comprehensible, the present disclosure will be described in detail below with reference to accompanying drawings and specific embodiments. It should be noted that embodiments in the present disclosure and features in the embodiments can be combined with one another if there is no conflict.

Many specific details are set forth in the following description to facilitate full understanding of the present disclosure, but the present disclosure can further be implemented in other ways different from those described herein, and therefore, the protection scope of the present disclosure is not limited by the specific embodiments disclosed below.

With reference to FIGS. 1-5, some embodiments of the present disclosure provide and describe a control method for a fan, a fan, a household appliance and a computer-readable storage medium below.

Figure 1:
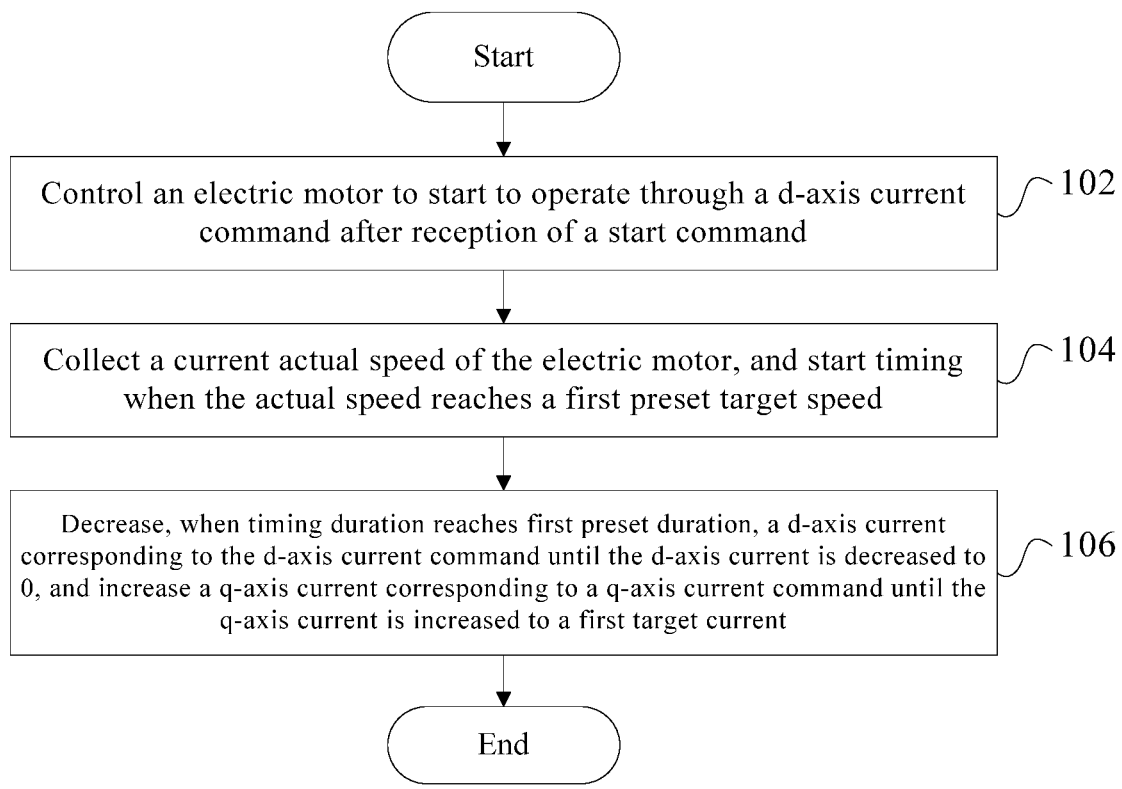
FIG. 1 shows a first flow diagram of a control method for a fan according to an embodiment of the present disclosure.

Some embodiments of the present disclosure provide a control method for a fan. The fan includes an electric motor. FIG. 1 shows a first flow diagram of a control method for a fan according to an embodiment of the present disclosure. As shown in FIG. 1, the control method includes:

Step 102, an electric motor is controlled to start to operate through a d-axis current command after a start command is received.

Step 104, a current actual speed of the electric motor is collected, and timing is started when the actual speed reaches a first preset target speed.

Step 106, when timed duration reaches a first preset duration, a d-axis current corresponding to the d-axis current command is decreased until the d-axis current is decreased to 0, and a q-axis current corresponding to a q-axis current command is increased until the q-axis current is increased to a first target current.

In the embodiment of the present disclosure, an open-loop control stage is firstly conducted after the start command is received in a motor starting stage. In the open-loop control stage, firstly, the electric motor is controlled to start to operate through a d-axis current command, that is, by applying a current to a d-axis of the electric motor. After the electric motor starts to operate, the actual speed of the electric motor is obtained in real time. When the actual speed of the electric motor reaches the first target speed, a timer is started synchronously to start timing.

If the timed duration reaches the first preset duration that is preset, the open-loop control stage is switched to a transition stage of switching to closed-loop control. In an embodiment, the d-axis current command gradually decreases the indicated d-axis current in the transition stage, and the q-axis current command is added, and the q-axis current of the electric motor is gradually increased. The d-axis current command gradually decreases the d-axis current of the electric motor from a maximum value to 0. Synchronously, the q-axis current command gradually increases the q-axis current of the electric motor from 0 to the first target current.

In the embodiment provided by the present disclosure, when back electromotive force of the electric motor is difficult to obtain in the motor starting stage, the electric motor is firstly controlled to be started through the d-axis current command. After the starting state, a stator current command applied by the electric motor is switched from the d-axis to a q-axis in a transition control stage of transitioning from an open-loop stage to a closed-loop stage. After adjustment of the q-axis current is completed, the electric motor may enter a closed-loop control stage according to a target air quantity setting of the fan, and smooth start and operation of the electric motor can be achieved without large-torque command control. In this way, starting the fan at a great air quantity due to a high starting speed of the electric motor cannot be caused, smooth start and operation of the electric motor can be ensured, vibration and noise during operation of the fan can be reduced, and further air quantity noise generated when the fan is started at a small air quantity can be reduced, and comfort of users can be effectively improved.

In some embodiments of the present disclosure, the step that the electric motor is controlled to start to operate through the d-axis current command includes the following steps: a second target current is determined according to the d-axis current command, and the electric motor is controlled to start to operate with the second target current as a d-axis current of the electric motor.

In the embodiment of the present disclosure, firstly, a preset d-axis current command is obtained in an open-loop control stage when the electric motor starts to operate. The d-axis current command may be a preset value stored in a controller of the electric motor, or may be transmitted from an upper control panel when a fan is controlled to be started, which is not limited by the embodiments of the present disclosure.

The d-axis current command indicates a maximum current value of the d-axis of the electric motor, which is the second target current described above. It should be understood that the maximum current value does not exceed a rated current of the electric motor. When the electric motor is started, the d-axis current of the electric motor is gradually increased at a certain speed until the d-axis current of the electric motor reaches a second target current value. In the stage, a speed of the electric motor is gradually increased. After the speed of the electric motor reaches a first target speed, timed duration after the speed of the electric motor reaches the first target speed is obtained. When the timed duration satisfies the first preset duration, the open-loop control stage is exited, and a transition stage of switching to a closed-loop control stage is entered. In the process, smooth start and operation of the electric motor can be achieved, and vibration and noise generated when the fan is started are reduced, and comfort of users can be effectively improved.

In some embodiments of the present disclosure, the step that the d-axis current command is adjusted to the q-axis current command includes the following steps: a d-axis current corresponding to the d-axis current command is decreased until the d-axis current is decreased to 0, and a q-axis current corresponding to the q-axis current command is increased until the q-axis current is increased to a first target current.

In the embodiment of the present disclosure, if timed duration reaches the first preset duration, an electric motor starts to transition from an open-loop control stage to a closed-loop control stage, that is, enters a transition stage. In the transition stage, the d-axis current command gradually decreases the indicated d-axis current, and the q-axis current command is added, and the q-axis current of the electric motor is gradually increased. The d-axis current command gradually decreases the d-axis current of the electric motor from a maximum value to 0. Synchronously, the q-axis current command gradually increases the q-axis current of the electric motor from 0 to the first target current.

In the embodiment of the present disclosure, a stator current command applied by the electric motor is switched from a d-axis to a q-axis in a transition control stage. After adjustment of the q-axis current is completed, the electric motor may enter the closed-loop control stage according to a target air quantity setting of a fan, and smooth start and operation of the electric motor can be achieved. In this way, vibration and noise generated when the fan is started are reduced, and comfort of users can be effectively improved.

In some embodiments of the present disclosure, the control method for a fan further includes the following step: a q-axis current corresponding to a q-axis current command is adjusted to a third target current when timed duration reaches a second preset duration.

In the embodiment of the present disclosure, an open-loop control stage is firstly entered after an electric motor is started. In the open-loop control stage, the electric motor is controlled to start to operate through the d-axis current, and timing is started after an actual speed of the electric motor is increased to a first target speed. When the timed duration reaches the first preset duration that is preset, the electric motor enters a transition stage of transitioning from open-loop control to closed-loop control. In the transition stage, control of the electric motor is switched from a d-axis current command to a q-axis current control command.

After the timed duration reaches the second preset duration that is preset, the electric motor completely enters a closed-loop control stage from a transition control stage. In this case, the q-axis current of the electric motor is adjusted to the third target current through the q-axis current command. In this case, the electric motor may operate stably and has a speed reaching a certain level. In this way, back electromotive force of the electric motor may be obtained timely and accurately, and a position of a motor rotor and the actual speed of the electric motor may be obtained according to the back electromotive force, and further closed-loop control may be achieved.

The embodiment of the present disclosure achieves smooth start and operation of the electric motor, may reduce vibration and noise during operation of the fan, and further may reduce air quantity noise generated when the fan is started at a small air quantity.

In some embodiments of the present disclosure, a rated current of an electric motor is set as a second target current. A product of the second target current and a preset coefficient is set as a first target current, where the preset coefficient ranges from 0.4 to 1.0. A current value corresponding to a speed of the electric motor when a fan operates at a minimum air quantity is set as the third target current.

In the embodiment of the present disclosure, the second target current is a maximum current, indicated by a d-axis current command in a motor starting stage, of a d-axis of the electric motor. The second target current is set as the rated current of the electric motor. Because the rated current of the electric motor is a fixed value, the second target current is further a fixed value when the d-axis current command is set.

The first target current is a q-axis current in a transition stage when the electric motor transitions from an open-loop control stage to a closed-loop control stage. The first target current is determined according to the second target current, that is, according to the rated current of the electric motor. In an embodiment, a ratio of the first target current to the second target current is 0.4-1.0. That is, the first target current is equal to a product of the second target current and a preset current. The preset coefficient ranges from 0.4 to 1.0. A specific value of the preset coefficient may be preset according to specific parameters of the electric motor, or dynamically adjusted according to implementation conditions of the electric motor, which is not limited by the embodiments of the present disclosure.

A control current of the speed of the electric motor corresponding to a minimum air quantity gear when the fan operates at the minimum air quantity gear is set as the third target current. In an embodiment, according to an air quantity of the fan, the air quantity of the fan may be divided into different gears. The minimum air quantity further corresponds to a lowest speed at which the electric motor may stably operate in a closed-loop manner. When the electric motor operates at the lowest speed, the q-axis current of the electric motor is the third target current described above. It may be understood that the third target current is further a preset constant current value because an air quantity gear of the fan is calibrated in advance.

In some embodiments of the present disclosure, a fan further includes a proportional integral controller. Before the q-axis current corresponding to the q-axis current command is adjusted to the third target current, the control method further includes the following step: control torque of the proportional integral controller is adjusted to control torque corresponding to the q-axis current.

In the embodiment of the present disclosure, the fan includes the proportional integral controller, that is, the PI controller. Closed-loop control of the electric motor may be achieved by the proportional integral controller. When the electric motor is switched from a transition stage to a closed-loop control stage, before the electric motor enters the closed-loop control stage, the electric motor is adjusted from q-axis current control to torque control corresponding to the q-axis current.

The proportional integral controller is a proportional integral controller based on air quantity adjustment. The system may output control torque required for adjustment to the target air quantity and the q-axis current command corresponding to the control torque according to an air quantity command set by a user and a current air quantity, and closed-loop control of the electric motor (fan) based on air quantity adjustment is achieved.

Figure 2:
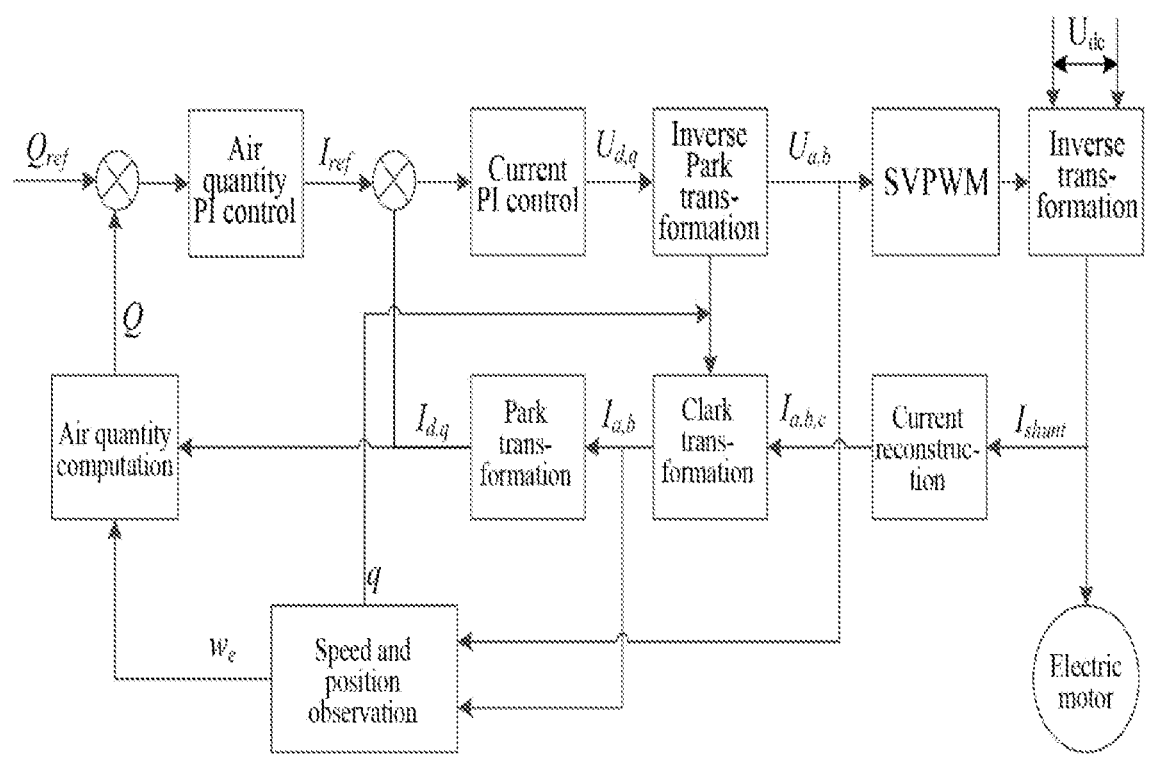
FIG. 2 shows a schematic logic diagram of constant-air-quantity closed-loop control of a fan according to an embodiment of the present disclosure.

In an embodiment, FIG. 2 shows a schematic logic diagram of constant-air-quantity closed-loop control of a fan according to an embodiment of the present disclosure. As shown in FIG. 2, a double-closed-loop vector control method of an air quantity loop plus a current loop is used in the constant-air-quantity closed-loop control. A system outputs a current command $I_{ref}$ corresponding to control torque currently required by an air quantity proportional integral (PI) controller according to an air quantity command $Q_{ref}$ set by a user and a current air quantity Q output from an air quantity computation device, then outputs a corresponding voltage command $U_{d,q}$ by a current PI controller, may obtain a voltage command $U_{a,b}$ in a two-phase static coordinate system after inverse Park transformation, and finally outputs a corresponding driving signal through space vector pulse width modulation (SVPWM), and operation of the electric motor is controlled.

Further, the system shown in FIG. 2 may further collect a direct-current busbar current $I_{shunt}$ of a three-phase inverter twice in each control period through a single-resistance current sampling method, and obtain three-phase currents $I_{a,b,c}$ of the electric through current reconstruction. Currents $I_{\alpha,\beta}$ in two-phase static coordinates may be obtained through Clark transformation of the phase currents. Then, currents $I_{d,q}$ in two-phase rotating coordinates may be obtained through Park transformation. Then, the system may accurately obtain the actual speed $\omega_e$ of the electric motor and a rotor position $\theta$ of the electric motor by speed and position observers.

Figure 3:
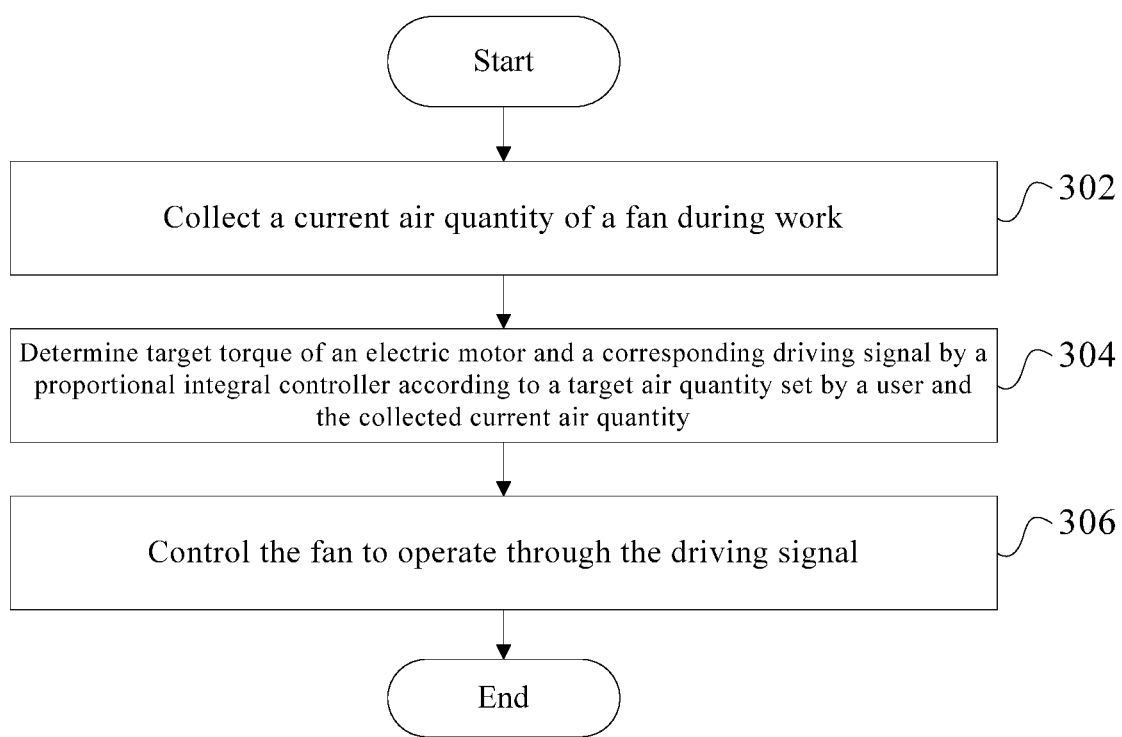
FIG. 3 shows a second flow diagram of a control method for a fan according to an embodiment of the present disclosure.

In some embodiments of the present disclosure, FIG. 3 shows a second flow diagram of a control method for a fan according to an embodiment of the present disclosure. As shown in FIG. 3, the control method for a fan further includes:

Step 302, a current air quantity of the fan during work is collected.

Step 304, target torque of an electric motor and a corresponding driving signal are determined by a proportional integral controller according to a target air quantity set by a user and the collected current air quantity.

Step 306, the fan is controlled to operate through the driving signal.

In the embodiment of the present disclosure, the electric motor is to enter a closed-loop control stage after timed duration reaches the second preset duration. In the closed-loop control stage, the fan achieves closed-loop control based on the air quantity by the proportional integral controller according to the target air quantity set by the user (or a computer program) and the current air quantity.

In an embodiment, a double-closed-loop vector control method of an air quantity loop and a current loop is used in closed-loop control based on a constant air quantity. Accordingly, the proportional integral controller includes an air quantity proportional integral controller and a current proportional integral controller. A control system of the fan firstly determines the target air quantity according to an air quantity command of the user, outputs control torque currently required for adjustment to the target air quantity and the corresponding current command (a q-axis current) by the air quantity proportional integral controller according to the current air quantity output from an air quantity computation device, outputs a corresponding voltage command by the current proportional integral controller, and finally outputs the corresponding driving signal through space vector pulse width modulation (SVPWM), and operation of the electric motor of the fan is controlled, and further a constant air quantity is obtained.

Figure 4:
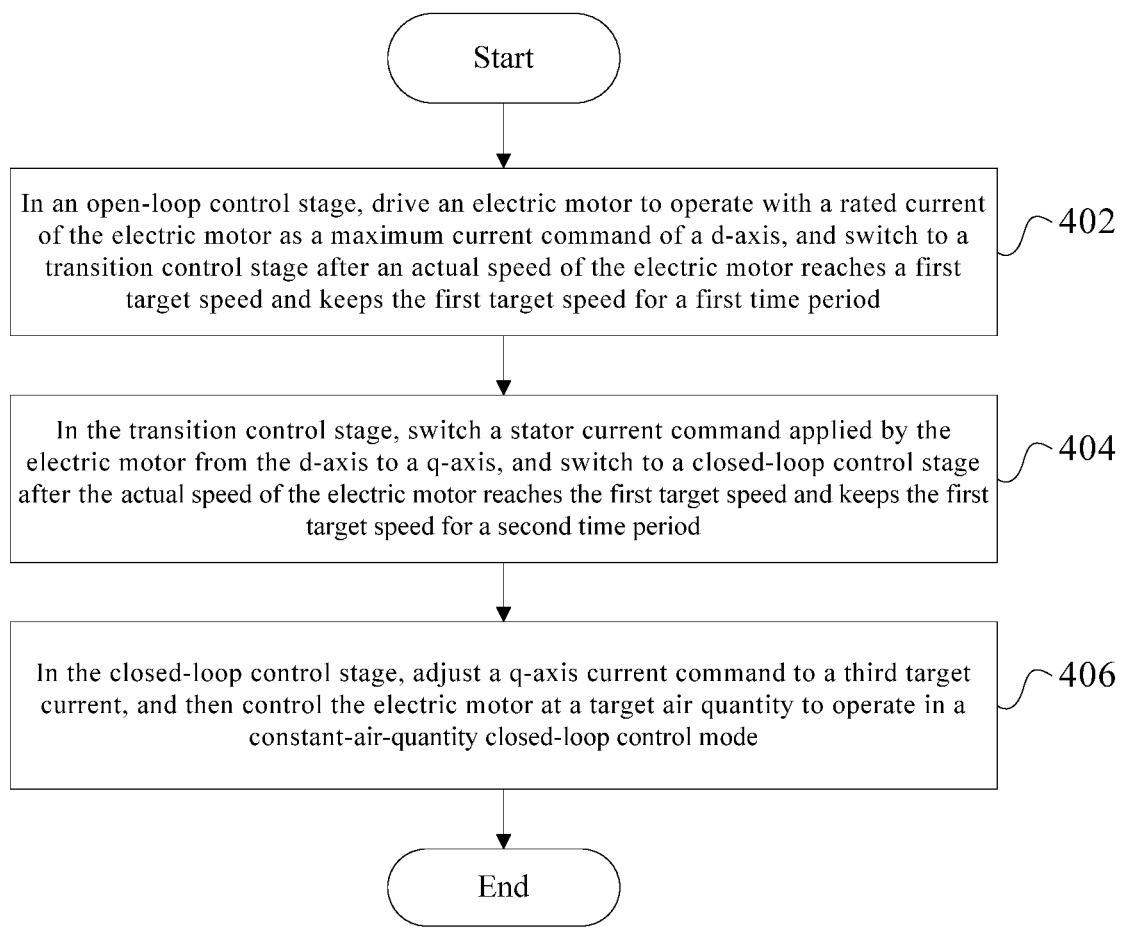
FIG. 4 shows a third flow diagram of a control method for a fan according to an embodiment of the present disclosure.

In an entire embodiment of the present disclosure, FIG. 4 shows a third flow diagram of a control method for a fan according to an embodiment of the present disclosure. As shown in FIG. 4, the control method for a fan includes:

Step 402, in an open-loop control stage, an electric motor is driven to operate with a rated current of the electric motor as a maximum current command of a d-axis, and after an actual speed of the electric motor reaches a first target speed and keeps the first target speed for a first time period, a transition control stage is switched to.

In Step 402, the electric motor is driven to operate with the rated current of the electric motor as the maximum current command of the d-axis as follows: a d-axis current command is gradually increased from 0 to a rated current value, and then the current command is kept to be the rated current value until a next control stage is entered. The first target speed is a speed point at which the electric motor may accurately observe the actual speed of the electric motor with an observer. After the electric motor reaches the first target speed through open-loop control and operates stably for a first time period, the electric motor enters the transition control stage.

Step 404, in the transition control stage, a stator current command applied by the electric motor is switched from the d-axis to a q-axis, and after the actual speed of the electric motor reaches the first target speed and keeps the first target speed for a second time period, a closed-loop control stage is switched to.

In Step 404, the stator current command applied by the electric motor is switched from the d-axis to the q-axis as follows: a q-axis current command of the electric motor is gradually increased to 0.5 time of the rated current while the d-axis current command of the electric motor is gradually decreased from the rated current to 0. Because a vector control strategy with id=0 is used in the closed-loop control stage, it is necessary to be ensured that the d-axis current command is 0 and all stator currents are applied to the q-axis before closed-loop control is entered. In the entire process, the actual speed of the electric motor further needs to be measured. After the actual speed of the electric motor reaches the first target speed and keeps the first target speed for the second time period, a constant-air-quantity control stage is switched to.

Step 406, in the closed-loop control stage, the q-axis current command is adjusted to a third target current, and then the electric motor is controlled at a target air quantity to operate in a constant-air-quantity closed-loop control mode.

In Step 406, the third target current refers to a current value corresponding to a minimum working air quantity command and a minimum working speed of the electric motor in the constant-air-quantity closed-loop control mode. The q-axis current command is adjusted to the third target current as follows: the q-axis current command is gradually adjusted from a transition control current to the third target current at a certain speed, and then the constant-air-quantity closed-loop control mode is entered after q-axis current adjustment is completed. In the constant-air-quantity closed-loop control mode, firstly, the target air quantity and a current actual air quantity are obtained regularly, and then control torque of the electric motor is output with an air quantity PI controller according to the target air quantity and the current actual air quantity. Finally, according to the control torque, operation of the electric motor is controlled, and constant-air-quantity closed-loop control is achieved.

In addition, before a constant-air-quantity control operation mode in the closed-loop control stage, the control torque output from the air quantity PI controller is initialized to control torque corresponding to the q-axis current command.

FIG. 2 shows a schematic logic diagram of constant-air-quantity closed-loop control of a fan according to an embodiment of the present disclosure. As shown in FIG. 2, a double-closed-loop vector control method of an air quantity loop plus a current loop is used in the constant-air-quantity closed-loop control. A system outputs a current command $I_{ref}$ corresponding to control torque currently required by an air quantity proportional integral (PI) controller according to an air quantity command $Q_{ref}$ set by a user and a current air quantity Q output from an air quantity computation device, then outputs a corresponding voltage command $U_{d,q}$ by a current PI controller, may obtain a voltage command $U_{\alpha,\beta}$ in a two-phase static coordinate system after inverse Park transformation, and finally outputs a corresponding driving signal through space vector pulse width modulation (SVPWM), and operation of the electric motor is controlled.

Further, the system shown in FIG. 2 may further collect a direct-current busbar current $I_{shunt}$ of a three-phase inverter twice in each control period through a single-resistance current sampling method, and obtain three-phase currents $I_{a,b,c}$ of the electric through current reconstruction. Currents $I_{\alpha,\beta}$ in two-phase static coordinates may be obtained through Clark transformation of the phase currents. Then, currents $I_{d,q}$ in two-phase rotating coordinates may be obtained through Park transformation. Then, the system may accurately obtain the actual speed $\omega_e$ of the electric motor and a rotor position $\theta$ of the electric motor by speed and position observers.

Figure 5:
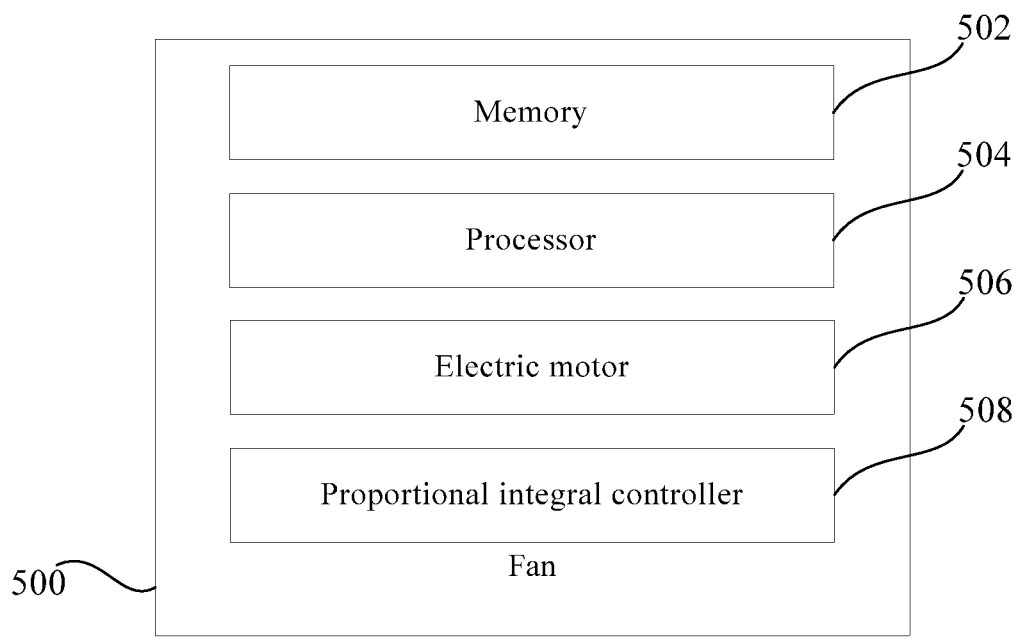
FIG. 5 shows a structural block diagram of a fan according to an embodiment of the present disclosure.

Some embodiments of the present disclosure provide a fan. FIG. 5 shows a structural block diagram of a fan according to an embodiment of the present disclosure. As shown in FIG. 5, the fan 500 includes a memory 502 storing a computer program or command comprising one or more codes; and a hardware processor 504 configured to implement steps of the control method for a fan according to any one of the embodiments when executing the program or command.

In an embodiment, an open-loop control stage is firstly conducted after a start command is received in a motor starting stage. In the open-loop control stage, firstly, an electric motor is controlled to start to operate through a d-axis current command, that is, by applying a current to a d-axis of the electric motor. After the electric motor starts to operate, an actual speed of the electric motor is obtained in real time. When the actual speed of the electric motor reaches a first target speed, a timer is started synchronously to start timing.

If timed duration reaches the first preset duration that is preset, the open-loop control stage is switched to a transition stage of switching to closed-loop control. In an embodiment, a mode of controlling the electric motor to operate through a d-axis current command is switched to a mode of controlling the electric motor to operate through a q-axis current command. That is, a current applied to the d-axis of the electric motor is gradually decreased, and a current applied to a q-axis of the electric motor is gradually increased, and operation of the electric motor is kept.

In the embodiment of the present disclosure, when back electromotive force of the electric motor is difficult to obtain in the motor starting stage, the electric motor is firstly controlled to be started through the d-axis current command. Then, after a speed of the electric motor is increased, the mode is switched to the mode with the q-axis current control command, and the electric motor enters a stable operation state without large-torque command control. In this way, starting the fan at a great air quantity due to a high starting speed of the electric motor cannot be caused, smooth start and operation of the electric motor can be ensured, vibration and noise during operation of the fan can be reduced, and further air quantity noise generated when the fan is started at a small air quantity can be reduced, and comfort of users can be effectively improved.

In some embodiments of the present disclosure, as shown in FIG. 5, the fan 500 further includes: an electric motor 506, where an output end of the electric motor 506 is provided with a fan wheel or fan blade; and a proportional integral controller 508 connected to the electric motor 506.

In the embodiment of the present disclosure, the fan includes the electric motor. The electric motor is a permanent magnet synchronous motor without a position sensor, a rotor of the electric motor is connected to an output shaft, the output shaft is the output end of the electric motor, and the output end is provided with the fan wheel or fan blade. The output shaft of the electric motor drives the fan wheel or fan blade to rotate, and air is directionally stirred to form air flows, and air supply is achieved.

The fan further includes the proportional integral controller, that is, the PI controller. Closed-loop control of the electric motor can be achieved by the proportional integral controller. The proportional integral controller includes an air quantity proportional integral controller and a current proportional integral controller. A control system of the fan firstly determines a target air quantity according to an air quantity command of a user, outputs control torque currently required for adjustment to the target air quantity and a corresponding current command (a q-axis current) by the air quantity proportional integral controller according to the current air quantity output from an air quantity computation device, outputs a corresponding voltage command by the current proportional integral controller, and finally outputs a corresponding driving signal through space vector pulse width modulation (SVPWM), and operation of the electric motor of the fan is controlled, and further a constant air quantity is obtained.

Some embodiments of the present disclosure provide a household appliance. The household appliance includes the fan according to any one of the embodiments, so the household appliance further includes all beneficial effects of the fan according to any one of the embodiments, which are not repeated herein.

The household appliance in the embodiment of the present disclosure may be an air conditioner, an electric fan, a gas appliance, a range hood, etc. The gas appliance may be a gas water heater, a gas stove, etc.

Some embodiments of the present disclosure provide a computer-readable storage medium storing a computer program or command. The program or command implements steps of the control method for a fan according to any one of the embodiments when being executed by a hardware processor, so the computer-readable storage medium further includes all beneficial effects of the control method for a fan according to any one of the embodiments, which are not repeated herein.

The methodologies described herein may be implemented by various means depending upon applications according to particular features and/or examples. For example, such methodologies may be implemented in hardware, firmware, and/or combinations thereof, along with software. In a hardware implementation, for example, a processor may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other devices units designed to perform the functions described herein, and/or combinations thereof.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media, or electrical signals transmitted through a wire.

In the description of the present disclosure, the term "a plurality of" refers to two or more, unless otherwise specified. Orientations or positional relations indicated by the terms "upper", "lower", etc. are based on the orientations or positional relations shown in the accompanying drawings and are only for facilitating the description of the present disclosure and simplifying the description, rather than indicating or implying that an apparatus or element referred to must have a particular orientation or be constructed and operated in a particular orientation, and therefore will not be interpreted as limiting the present disclosure. The terms "connect", "mount", "fix", etc. should be understood broadly. For instance, "connect" can indicate fixed connection, detachable connection, or integrated connection, or can indicate direct connection or indirect connection through an intermediary. For those of ordinary skill in the art, specific meanings of the above terms in the present disclosure can be understood according to specific circumstances.

In the description of the present disclosure, the terms "an embodiment", "some embodiments", "specific embodiment", etc. indicate that specific features, structures, materials or characteristics described in conjunction with the embodiment or illustrative description are included in at least one embodiment or instance of the present disclosure. In the present disclosure, the schematic description of the above terms does not necessarily refer to the same embodiment or instance. Moreover, the specific features, structures, materials or characteristics described can be combined in a suitable way in any one or more embodiments or instances.

What are described above are merely some embodiments of the present disclosure and are not intended to limit the present disclosure, and various changes and modifications can be made by those skilled in the art. Any modifications, equivalent substitutions, improvements, etc. made within the spirit and principle of the present disclosure should fall within the protection scope of the present disclosure.

What is claimed is:

1. A control method for a fan, wherein the fan comprises an electric motor, the control method comprising:
   determining a d-axis current command according to a first target current, wherein the first target current is the d-axis current of the electric motor;
   controlling the electric motor to start to operate through the d-axis current command;
   obtaining an actual speed of the electric motor, and starting timing when the actual speed reaches a first target speed; and
   decreasing, when the timed duration reaches a first preset duration, a d-axis current corresponding to the d-axis current command until the d-axis current is decreased to 0, and increasing a q-axis current corresponding to a q-axis current command until the q-axis current is increased to a second target current.

2. The control method for a fan according to claim 1, further comprising:
   adjusting the q-axis current corresponding to the q-axis current command to a third target current when the timed duration reaches a second preset duration.

3. The control method for a fan according to claim 2, further comprising:
   setting a product of the first target current and a preset coefficient as the second target current, wherein the preset coefficient ranges from 0.4 to 1.0;
   setting a rated current of the electric motor as the first target current; and
   setting a current value corresponding to a speed of the electric motor when the fan operates at a minimum air quantity as the third target current.

4. The control method for a fan according to claim 3, wherein:
   the fan further comprises a proportional integral controller; and
   before the adjusting the q-axis current corresponding to the q-axis current command to the third target current, the control method further comprises adjusting control torque of the proportional integral controller to control torque corresponding to the q-axis current.

5. The control method for a fan according to claim 4, further comprising:
   obtaining a current air quantity of the fan;
   determining target torque of the electric motor and a driving signal corresponding to the target torque by the proportional integral controller according to a target air quantity and the current air quantity; and
   controlling the fan to operate through the driving signal.

6. The control method for a fan according to claim 2, wherein:
   the fan further comprises a proportional integral controller; and
   before the adjusting the q-axis current corresponding to the q-axis current command to the third target current, the control method further comprises adjusting control torque of the proportional integral controller to control torque corresponding to the q-axis current.

7. The control method for a fan according to claim 6, further comprising:
   obtaining a current air quantity of the fan;
   determining target torque of the electric motor and a driving signal corresponding to the target torque by the proportional integral controller according to a target air quantity and the current air quantity; and
   controlling the fan to operate through the driving signal.

8. A fan comprising:
   a memory, storing a computer program or command; and
   a hardware processor configured to implement the control method according to claim 1 when executing the program or command.

9. The fan according to claim 8, further comprising an electric motor, wherein an output end of the electric motor is provided with a fan wheel or a fan blade.

10. A household appliance comprising the fan according to claim 8.

11. A computer-readable storage medium, storing a program or command, wherein the program or command implements the control method for a fan according to claim 1 when being executed by a hardware processor.

* * * * *